(12) United States Patent
Wiseman

(10) Patent No.: US 6,911,998 B2
(45) Date of Patent: Jun. 28, 2005

(54) AUTOMATIC CONFORMAL WINDOW SIZING IN A VIDEO IMAGING SYSTEM

(75) Inventor: John M. Wiseman, Hoover, AL (US)

(73) Assignee: Southern Research Institute, Birmingham, AL (US)

( * ) Notice: Subject to any disclaimer, the term of this patent is extended or adjusted under 35 U.S.C. 154(b) by 591 days.

(21) Appl. No.: 10/139,363

(22) Filed: May 7, 2002

(65) Prior Publication Data

US 2003/0210330 A1 Nov. 13, 2003

(51) Int. Cl.$^7$ ............................................. H04N 5/225
(52) U.S. Cl. ........................ 348/172; 715/800; 358/1.2
(58) Field of Search ................................ 348/170–173, 348/153, 159, 596; 358/1.2, 1.8; 715/700, 788, 800, 815; 382/118

(56) References Cited

U.S. PATENT DOCUMENTS 3,953,669 A * 4/1976 Saccomani et al. ......... 348/170
4,403,339 A * 9/1983 Wevelsiep et al. .......... 382/289
4,549,211 A * 10/1985 Assael et al. ................ 348/171
4,754,487 A * 6/1988 Newmuis ..................... 382/118
4,814,884 A * 3/1989 Johnson et al. ............. 348/596
5,825,432 A * 10/1998 Yonezawa .................... 348/563

* cited by examiner

Primary Examiner—Gims Philippe
(74) Attorney, Agent, or Firm—Connolly, Bove, Lodge & Hutz LLP

(57) ABSTRACT

An apparatus and method for generating a conformal window in a video tracking system. Each of the lines within the conformal window comprises a sub-window which is resized for each frame of video signal. The composite window comprising all the sub-windows is also resized vertically for each frame. The target image sub-windows are divided into left and right edge regions and a central region and are processed based on the density of pixels in the sub-window for each new frame. The target image is apportioned vertically into top and bottom regions and a central region, and lines of target image detail are processed to delineate new top, bottom and central regions for each subsequent frame of video signal. The resized window gradually assumes an orientation which conforms to the target image orientation.

21 Claims, 13 Drawing Sheets

PROBLEM

DIAMOND TARGET TRACKING

AUTOMATIC CONFORMAL WINDOW SIZING IN A VIDEO IMAGING SYSTEM

TECHNICAL FIELD

The present invention relates to the apparatus and method which are used for tracking moving target images. Specifically, a method and system are disclosed which creates a conforming window for separating a target image from background image information.

Tracking systems may be implemented which determine position errors from the location of a target image within a video image obtained from a sensor observing the target. An image sensor pointed under control of an azimuth/elevation tracking pedestal generates the image containing a target. The target image is monitored to automatically develop tracking signals for positioning the azimuth/elevation pedestal so that the image sensor axis is aligned with a target being tracked.

An electronic window is generated which is capable of separating target image detail from the remaining image detail generated by the image sensor. The ability to separate target image detail from remaining background image information reduces processing requirements while at the same time rejecting noise that could negatively effect the accuracy of the tracking error generated by the system. Accordingly, it is a conventional practice as set forth in U.S. Pat. No. 3,953,669 to control the electronic window so that it remains constantly positioned with respect to the target image to separate image detail from the remaining image detail. By continuously resizing the window on a video frame-by-frame basis, the target is maintained centered within the window so that background pixel information is effectively removed from the process of determining the positional errors for the image sensor.

The ability to accurately generate a window separating target image detail from background image detail is complicated when target images are not aligned with a rectangular window having a fixed orientation and that only allows variation in its length and width. Targets that may be accurately bounded by such a window when aligned with the window's fixed axes, will not bound the target accurately when the target image rotates with respect to the window's fixed axes.

The foregoing problem has been recognized in U.S. Pat. No. 4,549,211. The reference describes a system which provides a conforming window which specifically addresses the tracking of a target image having an axis which is essentially diagonal to the window axes. The disclosed system constructs a composite window from four sub-windows which remain fixed in orientation. The sub-windows change in length and width, and have an aspect ratio which is essentially equal to the aspect ratio of the composite window comprising all four sub-windows. The areas of the sub-windows are substantially equal, and the sum of all target image pixels within a sub-window is equal to an arbitrary fraction of the total area of the window. While providing improvements over a single window controlled in width and height, the four sub-windows proposed in the foregoing reference continue to introduce undesirable background image detail when processing target images having a diagonal orientation. In situations where the target has a very high aspect ratio and oriented diagonally in the image raster, two of the sub-windows may contain few, if any, target pixels, while the remaining two sub-windows include a high percentage of non-target background image information. This situation results in a decreased ability to accurately track the target.

SUMMARY OF INVENTION

It is the object of the present invention to provide a method for automatically sizing a region-of-interest or window that conforms to the shape of a segmented object contained within the image raster of a video signal. In accordance with the invention, as the image object changes in size, orientation and position over a sequence of video images, a window is generated which conforms to the shape, orientation, and position of the target image on a frame-by-frame basis.

The automatic sizing of a window containing a target image is provided by a device and method which produces a sub-window for each line containing the target image. Successive frames of the video signal containing the image have line sub-windows which are independently resized in order to more closely track the orientation and position of the target image. In this way, the horizontal dimension of the window is controlled for any orientation of the target image.

A vertical dimension for the composite window comprising the line sub-windows of the target image also changes on a dynamic basis. The composite window is partitioned vertically into an upper half and lower half. The upper half is further partitioned into a top edge and a target region, and, likewise into a bottom edge and a target region for the lower half. Additional lines of image data are added or removed to the conforming window along the top edge and bottom edge regions depending on the target pixel density in the respective regions computed from the image data in the previous video frame. When the top or bottom of the window grows, the target and edge regions are extended along the principal orientation of the target.

The target image window is also repositioned on a frame-by-frame basis. The overall target centroid is determined for the object, and subsequent frames of the image have a window shifted in the direction of the determined target image movement.

The present invention provides for a composite window which adapts both horizontally and vertically to conform to the shape and orientation of the target image produced by the video signal.

DESCRIPTION OF THE PREFERRED EMBODIMENT

Figure 1:
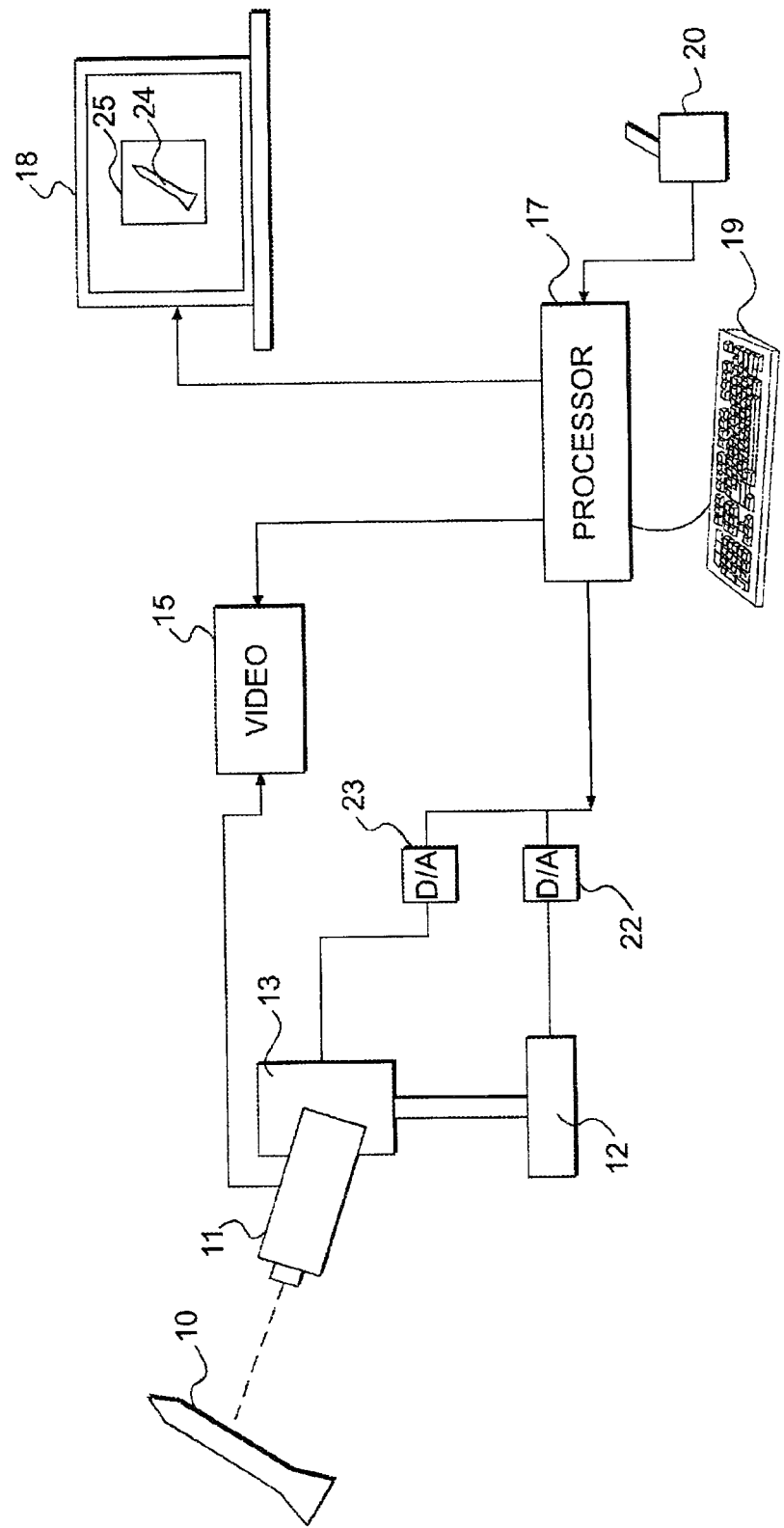
FIG. 1 illustrates the system architecture for a video tracking system.

Referring to FIG. 1 there is shown an optical tracking system which generates a video signal containing target information. A target 10 is imaged by an optical sensor 11, which may be a video camera positioned by an azimuth 12 and elevation 13 tracking pedestal. The system generates $\Delta EL$ (elevation) and $\Delta AZ$ (azimuth) signals for maintaining the sensor 11 optical axis on the target 10.

A video signal amplifier 15 is shown which produces detected video for processing by processor 17 and for display on monitor 18. Monitor 18 produces a visual image 24 of the target, and additionally displays a boundary window 25 generated by processor 17 which separates target image 24 detail from background image detail. The conventional video tracking system includes a positioning device 20, shown as a joy-stick in FIG. 1 which is capable of initially positioning the window 25 to include the target image 24.

The processor 17 in conventional video tracking systems determines from gray scale values of pixels within window 25 the relative movement of target image 24. The information on bus 21 creates tracking error signals $\Delta EL$, $\Delta AZ$ that are sent to D/A 22, D/A 23, for controlling the elevation 13 azimuth 12 positioning pedestal. A standard keyboard 29 provides user access to the processor 17 as is known in general purpose computing systems. Window 25 limits processing of pixels to the target image 24 so that excessive computation time is avoided, and to keep background pixels from interfering with the calculation of tracking error signals.

Figure 2:
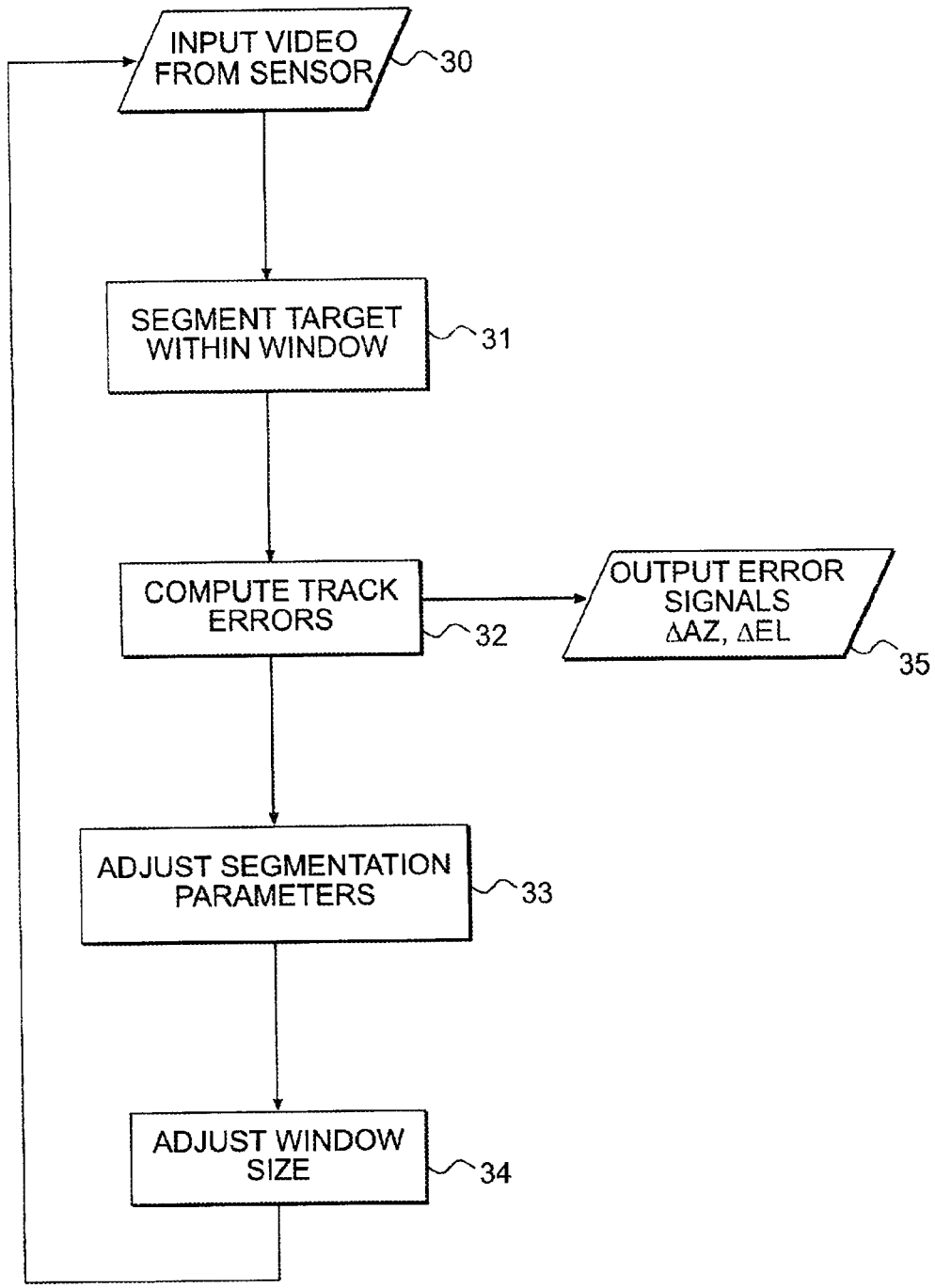
FIG. 2 is a high level flow chart illustrating the process for tracking a target.

The operation of the system of FIG. 1 is shown generally in the flow chart of FIG. 2. Input from the sensor or camera 11 is provided at 30. The processor 17 may classify the pixels as target or background pixels based upon their gray scale value, and segment the target 24 within a window 25. Initially, window 25 may be positioned with the joystick 20 so that the process of segmentation may begin. The pixels within the window 25 may be classified as either pixels belonging to the target, or not, by comparing pixel intensity (gray scale) of each pixel with a segmentation threshold.

Once the pixels are classified as belonging to the target or to the background at 31, it is possible to determine movement of the target image so that tracking errors can be determined in step 32. The tracking error signal outputs at 35 are applied to digital to analog converters 22 and 23 from a common bus 21 where they generate signals for positioning the video sensor 11. The tracking error signals will drive the video sensor 11 position so that its optical axis intersects the target 10. The target image 24 will therefore stay centered in the sensor field-of-view but may change in size and/or orientation depending on the target motion relative to the sensor.

The parameters used to segment the target within the window are controlled in step 33 to take into effect changes in the contrast between the target images and background images. The segmentation threshold values for separating target image pixels from background image pixels are based upon this parameter adjustment.

Additionally, the size of window 25 is controlled in step 34 to maintain a high percentage of target image pixels within window 25, thus reducing the aforesaid computation time for processing target images, as well as reducing any background pixel information which may interfere with accurately tracking the target.

Figure 3:
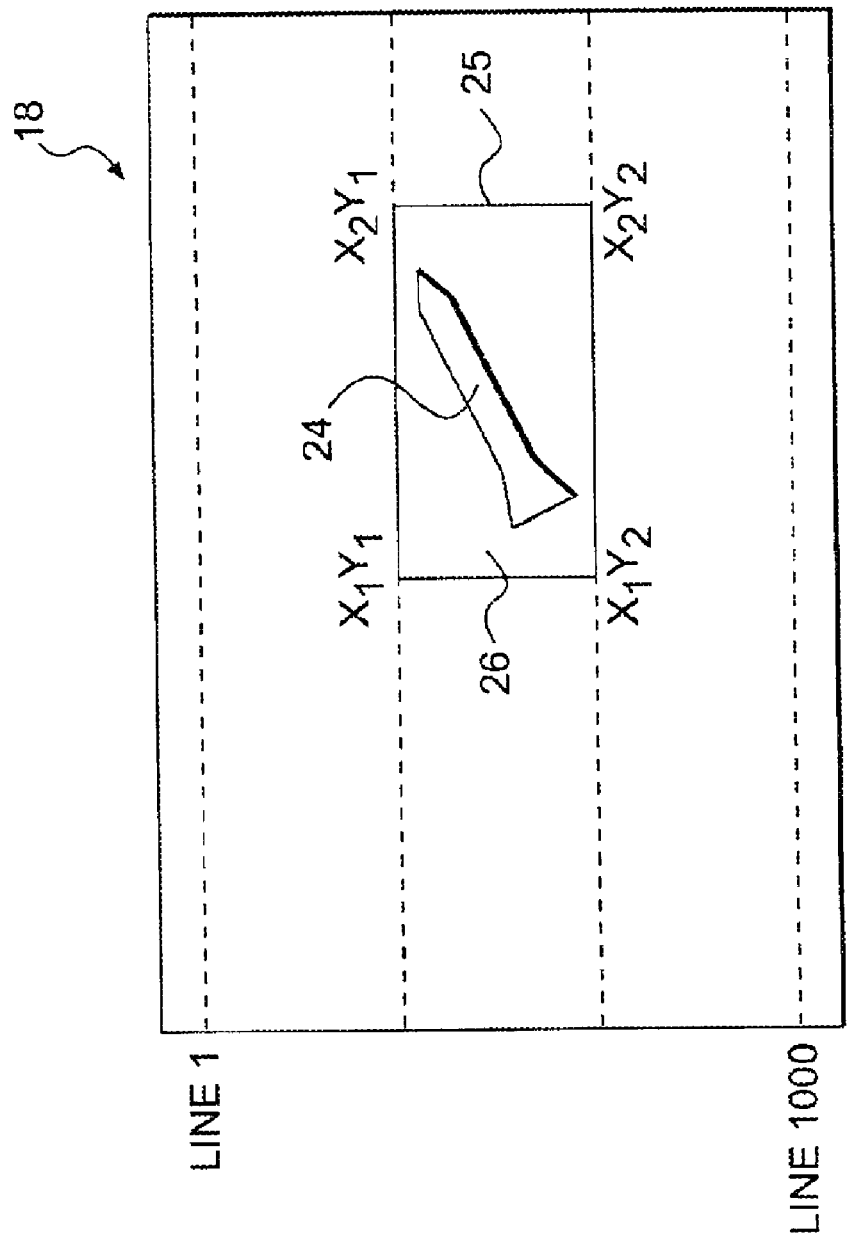
FIG. 3 is a view of a video monitor having a window for separating target image pixels 24 from background image pixels 26.

FIG..3 illustrates a video image containing a target image 24 within a window 25. The rectangular window 25 is confined by rows of pixels $X_1$, $X_2$, and columns of pixels $Y_1$, $Y_2$, and in accordance with the prior art, remains in the orientation with major axes parallel and perpendicular to the lines of image pixels. As can be seen from FIG. 3, while window 25 delimits most background pixel information from target image 24 pixels, a remaining amount of background pixels 26 are included within window 25.

Figure 4A:
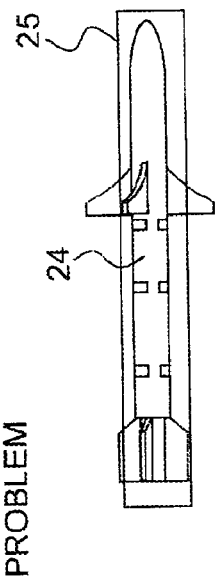
FIG. 4A shows the alignment of a target image 24 with the horizontal w axis of a rectangular window 25.
Figure 4B:
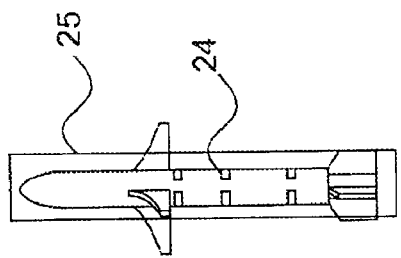
FIG. 4B shows the rectangular window 25 aligned with the vertical axis of a target 24.
Figure 4C:
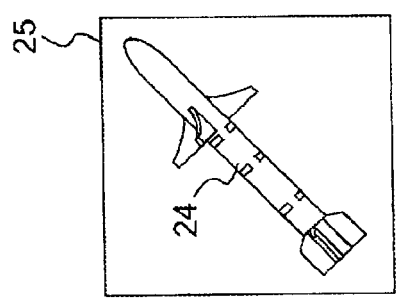
FIG. 4C illustrates the effects of a diagonal orientation of the target 24 with respect to the rectangular window 25.
Figure 4D:
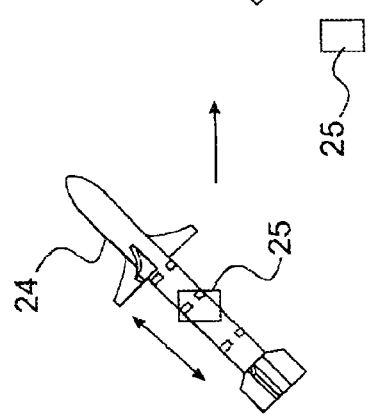
FIG. 4D illustrates the change in sizing of the horizontal and vertical dimensions of the window 25 with a diagonally oriented target image.
Figure 4E:
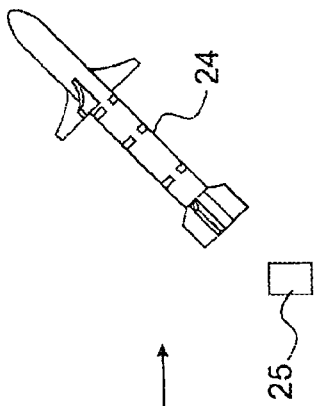
FIG. 4E shows the instabilities of the window 25 when attempting to track a diagonally orientated target image 24.

The effects of changes in orientation of the target image 24 within the generally rectangular window 25 is illustrated in FIGS. 4A–4E. FIGS. 4A and 4B illustrates the target image 24 axis aligned with one or the other of the axes of the rectangular window 25. FIG. 4C illustrates a diagonal orientation of the target image axis with respect to window 25 at approximately 45°. Typical video tracking systems will tend to shrink the window 25 as shown in FIG. 4D, such that only a small portion of the target image is enclosed within the window 25. The arrows show that the window 25 will move along the axes of the target 24 as each frame of video signal is processed. The instability shown in FIG. 4D, eventually causes, as shown in FIG. 4E, the window 25 to lose its locked position with respect to the target image 24. This results in tracking errors so significant that the system of FIG. 1 looses its locked position with respect to the tracked target 11.

Figure 5:
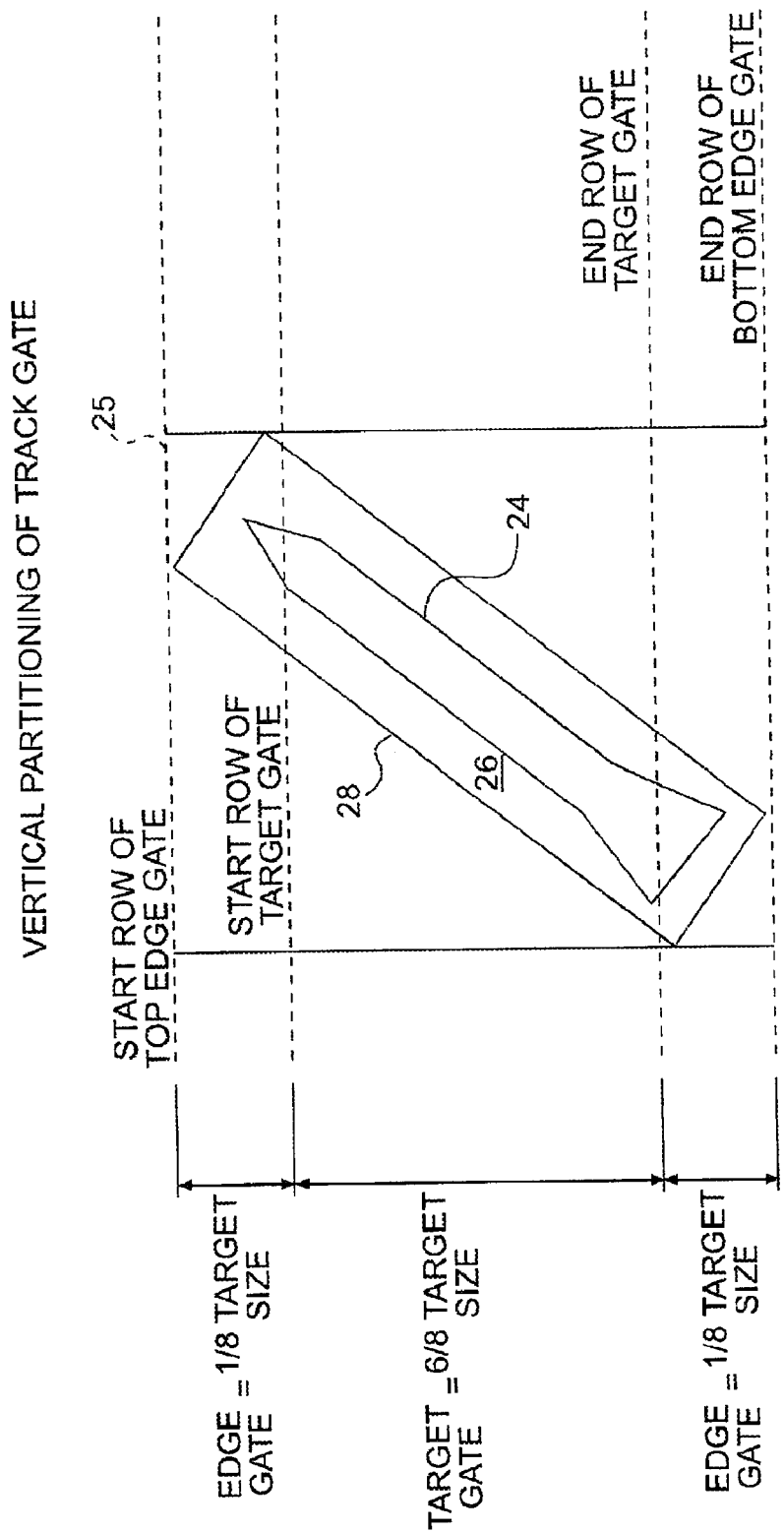
FIG. 5 shows the process of partitioning a target image vertically in accordance with one embodiment of the invention.

The present invention avoids the foregoing consequence by generating a conformal window 28 which encloses the target image 24, and which is substantially unaffected by the orientation of the target image 24 with respect to the axes of the window FIG. 5 illustrates in dotted lines a conventional rectangular window 25, and a conformal window 28 which is generated in accordance with the preferred embodiment of the invention. Whereas the prior art window 25 would include numerous background pixels which would require processing in order to determine whether or not they were part of the image, the conformal window 28 of the present invention reduces the number of background pixel 26 which must be processed.

The present invention generates the conformal window 28 by processing three distinct regions (gates) of the target image 24. The first is a top edge gate which constitutes about one-eighth of the entire target size. The next is a bottom edge gate, also constituting approximately one-eighth of the target size along the vertical dimension. The top edge gate and bottom edge gates include pixels which are part of the target image 24, as well as background pixels 26. The remaining portion of the target image 24, constituting three-fourths of the entire vertical dimension of the window, forms the target gate. The edge gates generally contain a higher percentage of background pixels compared to the central target gate.

Figure 6:
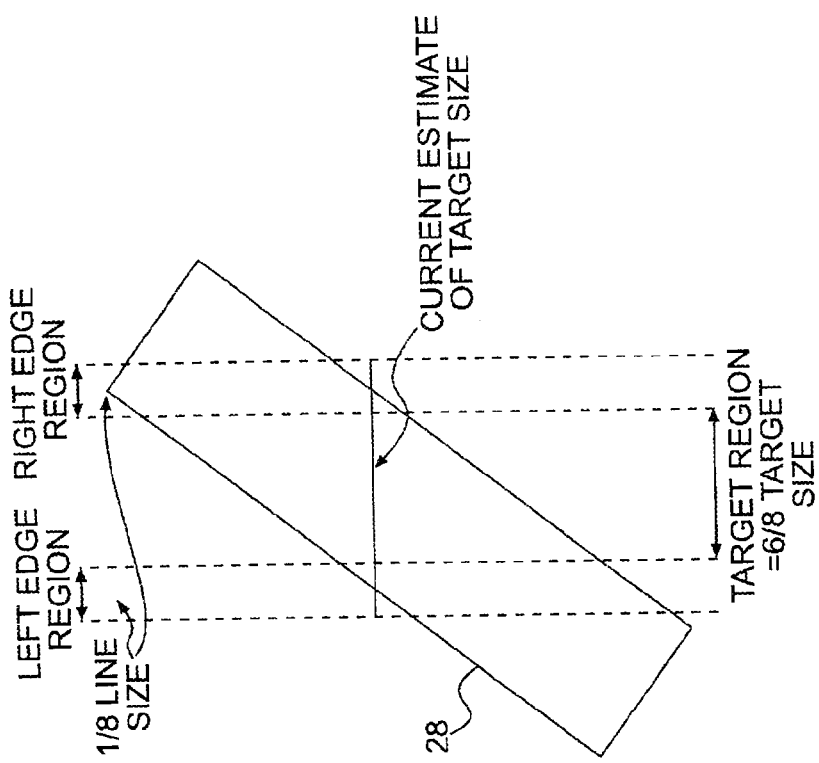
FIG. 6 illustrates the partitioning of a line based sub-window.

In order to obtain a conforming window at 28, the window 28 is broken up into a plurality of sub-windows constituting each line of pixels contained within the target image. Window 28 is apportioned laterally in accordance with FIG. 6. FIG. 6, shows one line of pixels within the window 28. The line of pixels has a line length comprising a right edge region, a left edge region and a central target region. The window which begins as a rectangular window 25, as shown in FIG. 5, eventually adapts to the target shape to form a conforming window 28.

Figure 7:
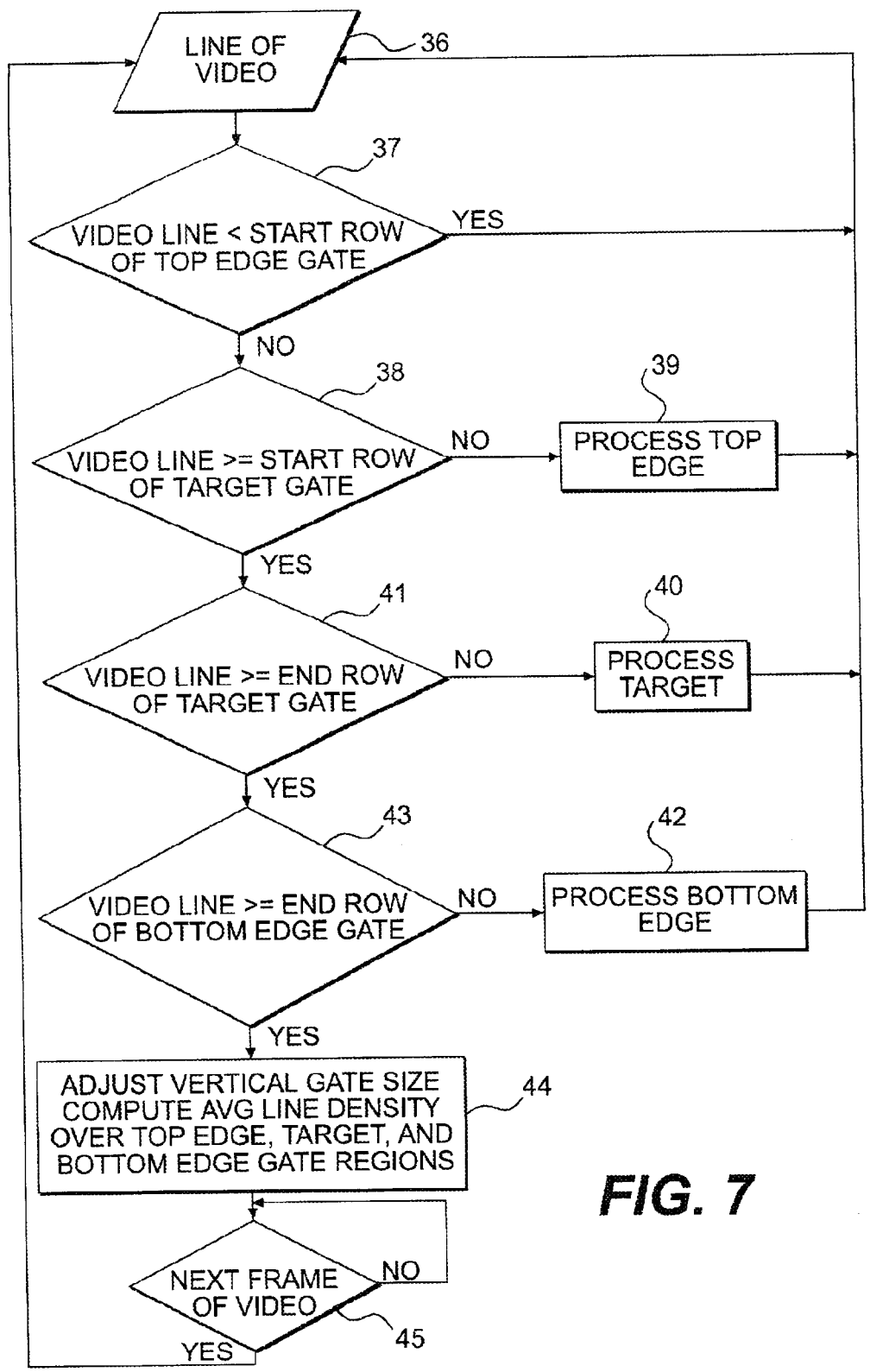
FIG. 7 illustrates the processing of the window of target image in accordance with a preferred embodiment of the invention.

The process of creating window 28 is shown more particularly in FIG. 7. Each line of video signal in the frame is supplied in step 37 is processed by processor 17. When the first row of the top edge region is reached, all of the rows of pixels in the first one-eighth of the full image target size are processed according to FIG. 7. The software running within the processor 17 of FIG. 1 determines from each frame of incoming video when the start row of the top edge region is reached as detected in decision block 37, and the processing of the top edge region begins in step 39. As will be evident with respect to the subject matter of FIG. 8, this continues for every line within the top region, and when decision block 38 detects that the current line of video is equal to the central target region start row, the target region 40 will be processed in accordance with the steps of FIG. 9. Once all of the lines within the central target region are processed, as determined in decision block 41, the bottom edge region lines of video signal are processed in step 42, as shown more particularly in FIG. 10.

Once the processing of the bottom edge region has been completed, as determined in decision block 43 by the line number for the last line within the window enclosing the target image, the vertical window size is adjusted in step 44 to determine a new bottom region, top region and target region for the next frame of video signals coming in. In this way, the vertical height of the target image is constantly adjusted for each frame of video signal corresponding to changes in the target image size.

The next frame of video signal is processed when it is determined that the current frame has been completely processed in step 45.

The forgoing illustrates top-level control over the vertical dimension of the window. The horizontal dimension for the window is derived by computing a new line size during processing of the rows of pixels in each of the top edge, central target and bottom edge gates.

Figure 8:
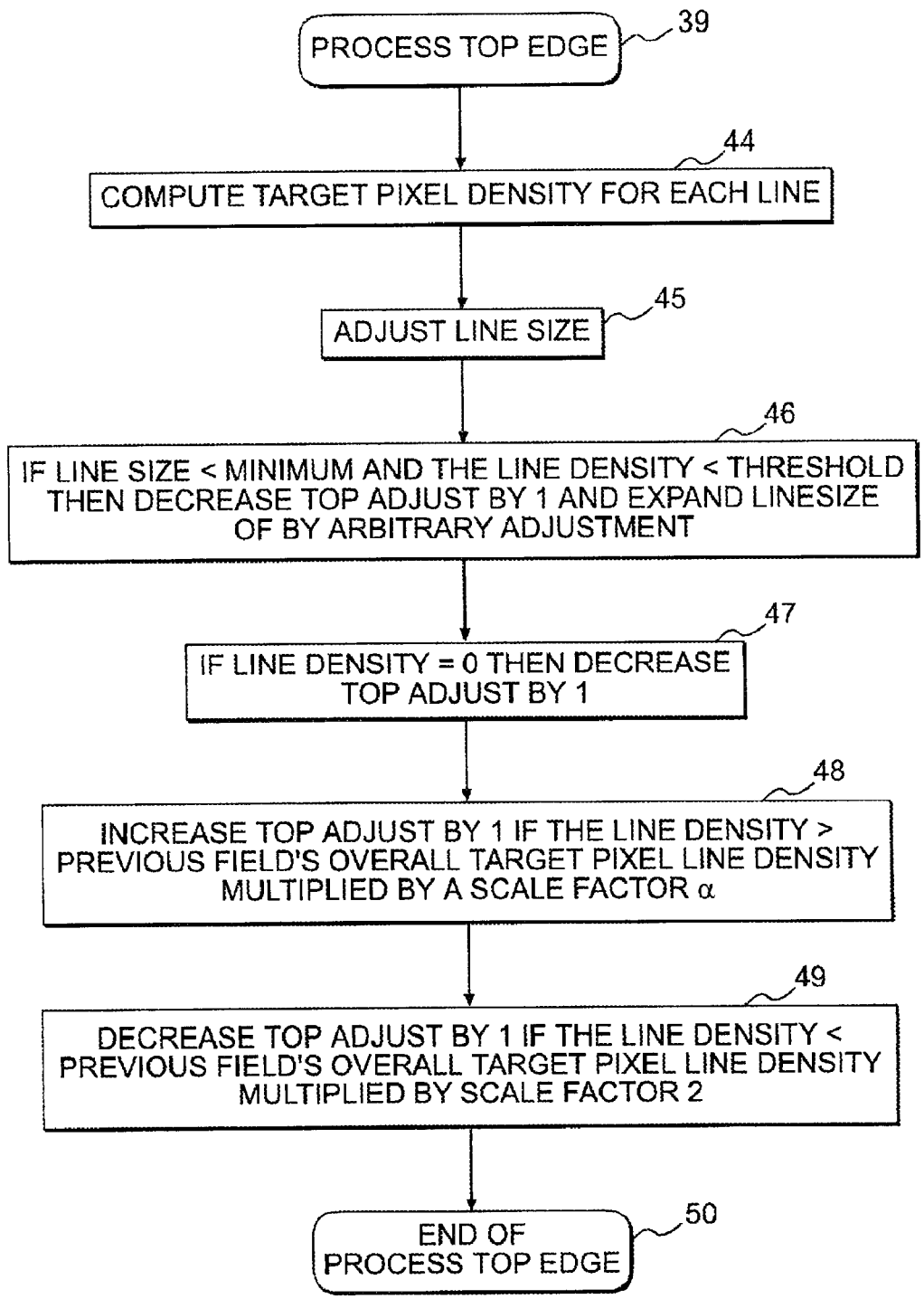
FIG. 8 illustrates the steps for processing the top edge region of the target image.

The control over the horizontal dimension of each line sub-window for establishing the width of the window 28 with respect to the target image 24 can be illustrated with respect to the process steps of FIG. 8. When the routine enters the top edge region processing at step 39, the target pixel density for each line within the top edge region is computed in step 44. The line size is then adjusted in step 45, in accordance with a process illustrated in FIG. 11 and described below. By adjusting the line size, the next frame of video signal will have a sub-window line size either increased or decreased from the current line size.

Once the line size for the next frame has been adjusted in step 45, a determination is made as to whether or not the edge region is to be moved upwards or downwards. In step 46, a determination is made for each line whether or not the line density is less than a minimum threshold value, and whether the line size is less than a minimum threshold value.

If this condition is determined in step 46, the line size is expanded by an arbitrary constant adjustment and the top adjustment is reduced by 1. If the line density is determined in step 47 to be equal to zero, then the top adjustment is decreased by one more line.

Step 48 makes a determination to increase the starting row of the top region by one if the line density is greater than the overall target pixel line density of the previous frame, multiplied by a factor α. Step 49 decreases the top line in the region by one if the line density is less than the previous field's overall target pixel line density of that line, multiplied by another scale factor of β.

Figure 12:
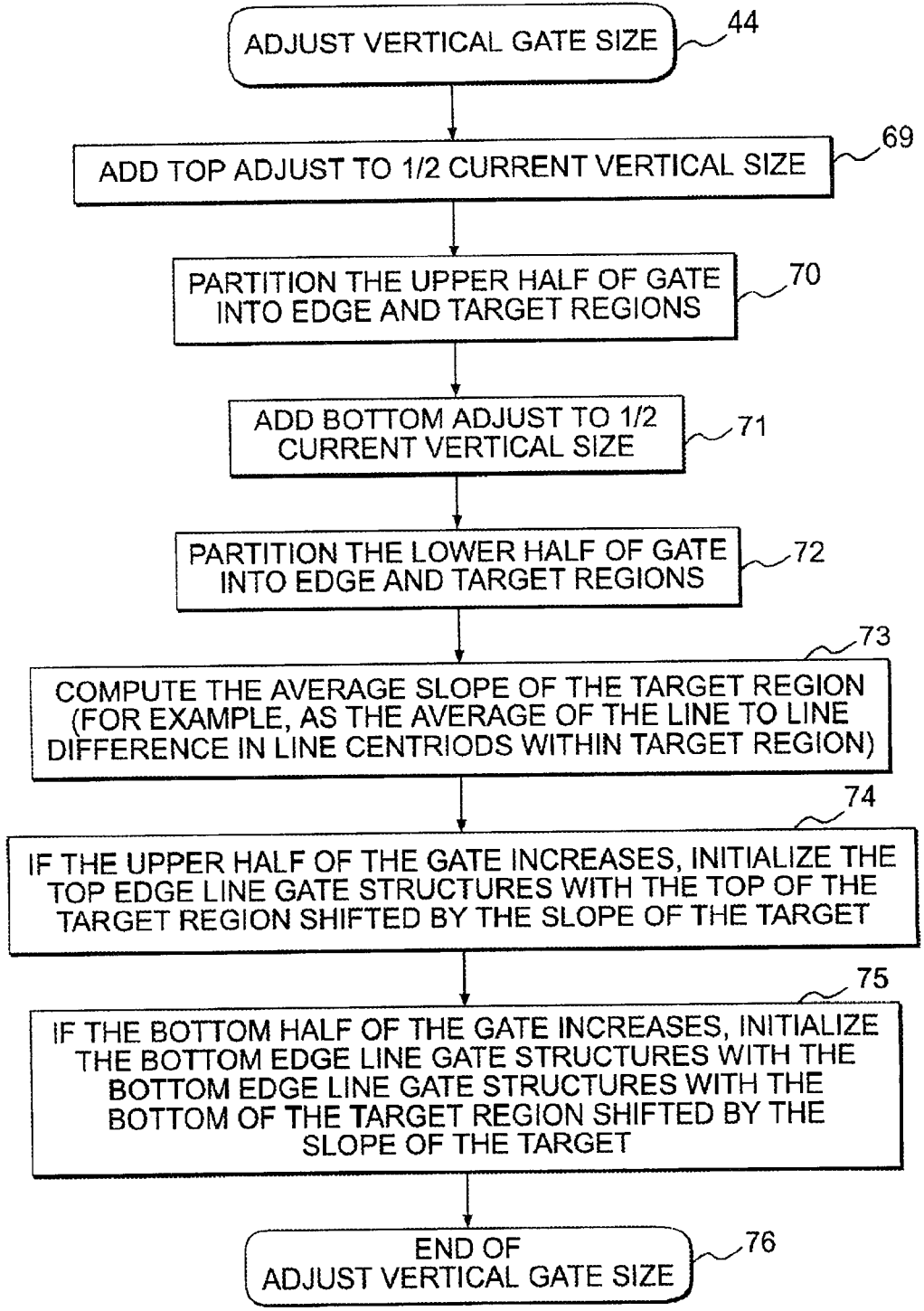
FIG. 12 illustrates the process for controlling the vertical window size.

The routine of FIG. 8 is executed for each line within the current frame top edge region, and the adjustment factors determined in steps 46, 47, 48 and 49 are accumulated for each line, and the accumulated adjustment is used in the next frame to set the start row for the top region of the window as shown in FIG. 12.

Figure 9:
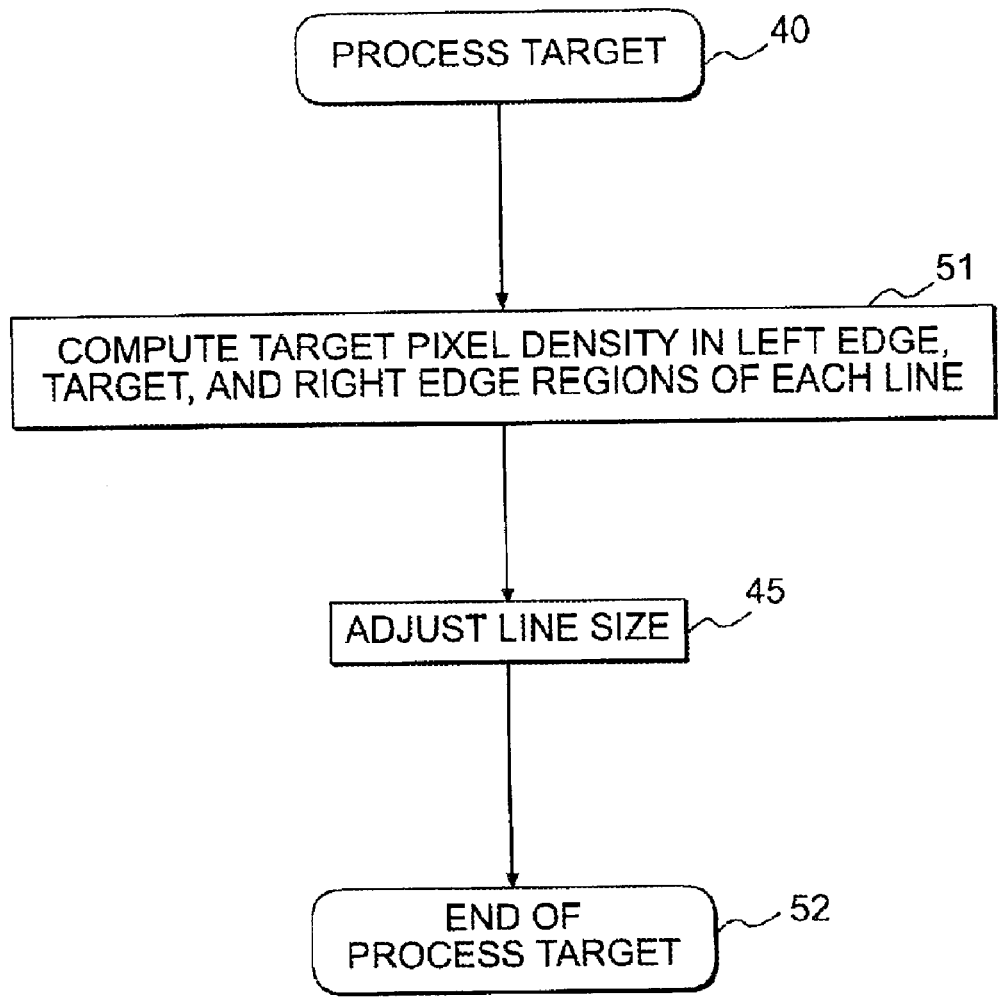
FIG. 9 illustrates the steps for processing the central target region of the target image.

Following processing of the top edge region, FIG. 9 illustrates how the central target region is processed. The central target region processing 40 begins by computing the target pixel density in the left edge, central target region, and right edge region of each line within the central target region in step 51. The line centroid is computed and compared with the line centroids of adjacent lines to derive a principal orientation of said target. The newly computed line centroid is not permitted to deviate from an adjacent line by more than some arbitrary amount, for example, 15 pixels. This restriction is based upon the assumption that the target shape varies slowly. Based on these computations, as would be evident from the process illustrated in FIG. 11, the line size is adjusted in process step 45. Each line within the central target region is thereby adjusted in size, from that of the presently processed frame of video signal, so that a new line width is obtained for each row of pixels within the current frame video signal until all sub-windows for the central region are processed in step 52. In this way, the width of the window is controlled so that it eventually conforms to the orientation of the target image shown in FIG. 5.

Figure 10:
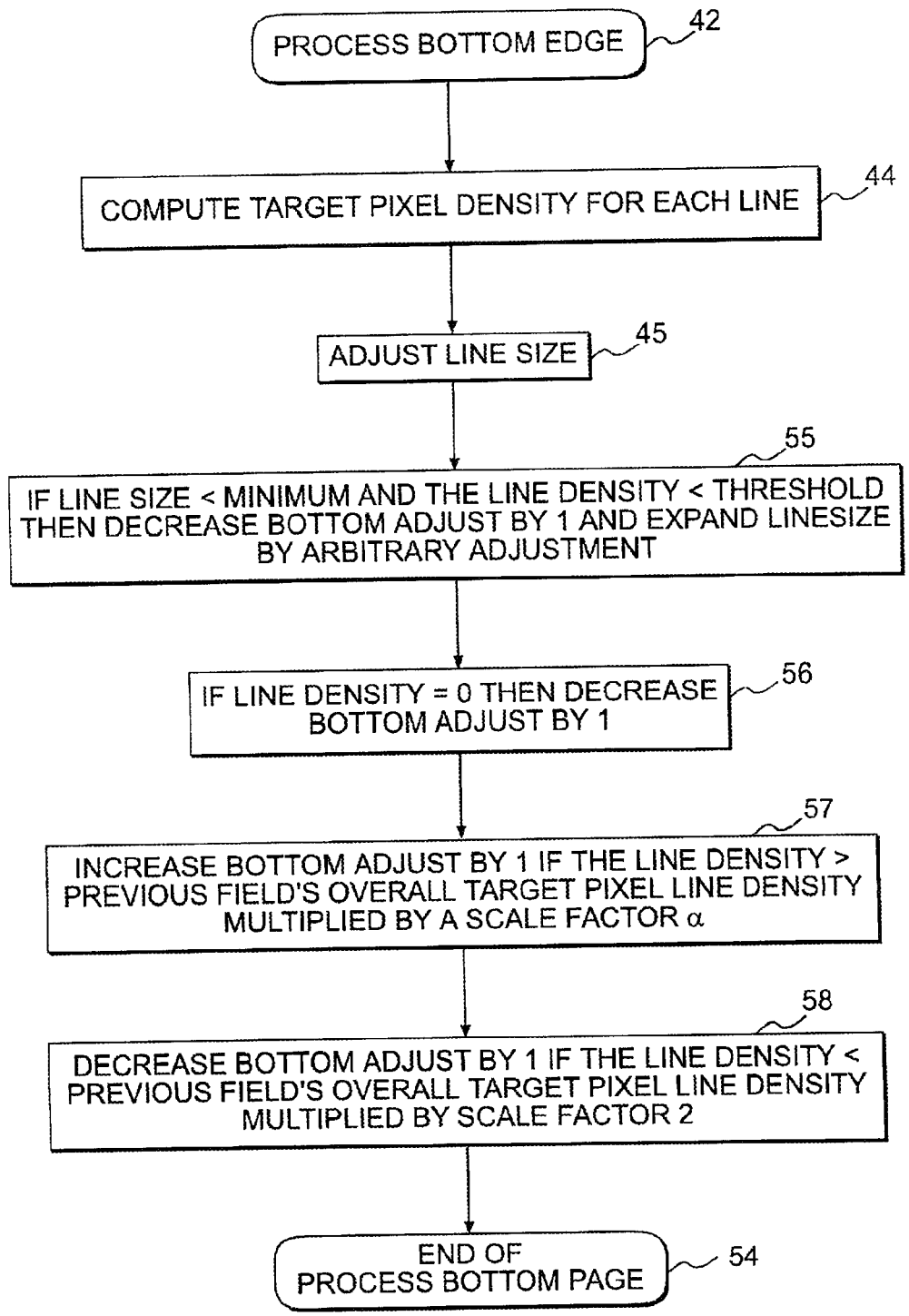
FIG. 10 illustrates the steps for processing the bottom edge region of the target image.

A processing of the bottom edge is performed identical to that of the top edge. As illustrated in FIG. 10, the target pixel density for each line within the window of the bottom edge region is computed in step 44. A line size adjustment is made in step 45, thus, constituting a sub-window adjustment for the sub-window. Steps 55, 56, 57 and 58 determine whether adjustments to the bottom region are necessary. The adjustments are calculated for each line within the region, and then a total adjustment is made based on the sum of adjustments calculated for each line. The bottom edge region processing is concluded in the step 54.

The computation of the new line size for each sub-window (line) is common to all three vertical regions. The process for adjusting the line size is illustrated more particularly in FIG. 11. Referring to the process of FIG. 11, a procedure is shown for calculating a new line size for the next frame of video signal. Readjusting the line size in subsequent frames of the video signal changes the size of a sub-window containing the target image. Beginning with an initial rectangular window, the size of each line segment representing the target image is expanded or decreased for each frame to achieve a conformal window for the target image.

The adjustment of the line size is done taking into account the density of each portion of the apportioned line of FIG. 6. The sub-window representing a row of target image pixels consists of a right edge region, left edge region and a central target region as shown in FIG. 6. The process of FIG. 11 assigns weighting factors to the central target portion, the edge portions and also provides a reference weight in step 60.

An edge density representing the pixel density for edge regions of the line sub-window are computed in step 61. The edge density comprises the left edge density determined from all of the pixels in the left edge region of the line, plus the right edge density comprising the density of all the pixels in the right edge region, and the absolute value of the difference between the left edge density and right edge density. Based on the edge density determination, a size error for the line can be computed in step 62. The size error comprises the following calculation:

SizeError=(Target Wt*Target Density+Edge Wt*EdgeDensity−Reference Wt)*(Current Line Size/2)

Based on the determination of a size error, additional calculations represented in blocks 63 and 64 are used to evaluate whether the size error should be adjusted. These size error adjustments are used to weight the growth of the line when the line size is very small or more heavily weight a size reduction when the line size is large. In block 63, if the line of the target image is less than 10 pixels, and the size error is greater than 0, than the size error is multiplied by a factor of 2 as the correction factor. In step 64, if the current line size was determined to be greater than 50 pixels, and the size error had been less than 0, then the size error would be multiplied by 1.2 to derive a new size error. The new line size is then determined in step 65 as the current line size modified by the size error.

Figure 11:
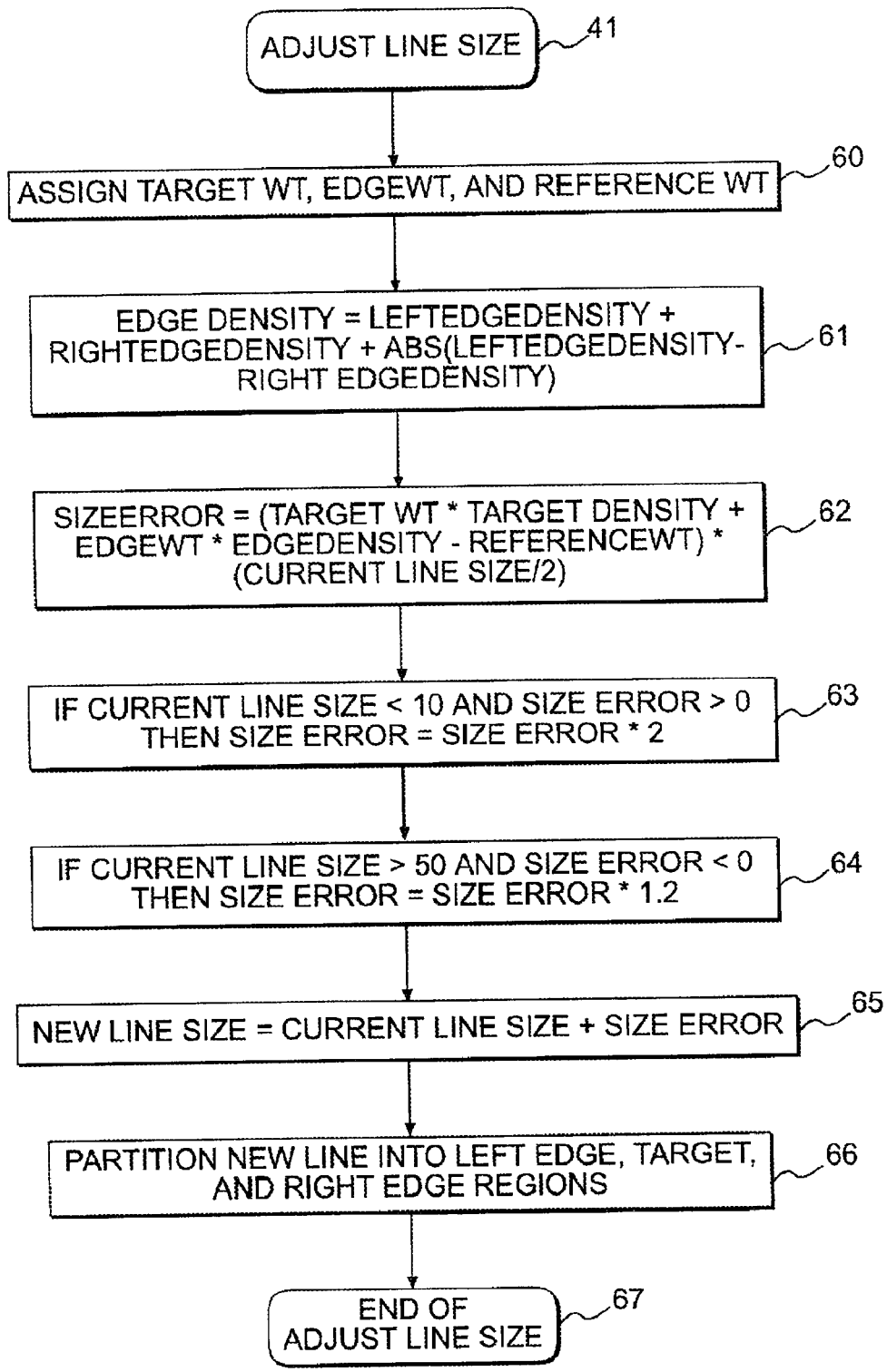
FIG. 11 illustrates the steps for adjusting the size of the line based sub-windows.

After the new size for the current line has been computed, the new line is apportioned into left edge, target, and right edge regions in step 66, as shown in FIG. 6. Once the new line is apportioned, the process of FIG. 11 is concluded in step 67 for the given line.

Once the adjustments for determining the new top region starting line, central target region and bottom region ending line are determined, the size of the vertical dimension of the window shown in FIG. 5 is adjusted in accordance with FIG. 12.

FIG. 12 illustrates the process executed by the processor 17 of FIG. 1 to establish the vertical window size for each frame of video signal in accordance with the top and bottom adjustments which were computed in FIGS. 8 and 10. Additionally, the subsequent frame is apportioned into top edge regions and bottom edge regions. If the target has grown, the window is expanded by adding additional lines at the top and/or bottom of the target. The starting and ending points of the additional lines are determined by shifting vertically and horizontally the starting and ending points of the top line of the target region in accordance with the target slope. The target slope can be estimated by a variety of methods. One approach is to compute the slope from the centroids for each sub-window in the central target region. In this way, the lines added to the window shift in such a way that the start and end points of the additional lines of the window conform to the lateral sides of the target.

The specific process steps for carrying out the adjustment of the vertical window size are shown in FIG. 12. Referring now to FIG. 12, the amount of adjustment to the top region of the subsequent frame is added to one-half of the current vertical window size in step 69. The current window size is first apportioned, as will be evident with respect to FIG. 13, before adding adjustments to the top edge region and bottom edge region. The process for apportioning the target into an upper half and lower half will be explained more completely with respect to FIGS. 13 and 14.

The upper half of the window is portioned into edge and target regions in step 70. Following the apportioning step, the bottom adjustment is added to one-half the current vertical window size in step 71. The lower half of the window is then apportioned into bottom edge and central target regions in step 72. The average slope of the sub-windows in the central target region is then computed in step 73. This may be, for example, determined as the average of a line-to-line difference in line centroids within the central target regions. Alternatively, the principal orientation of the target may be estimated as the average of the slope between the starting points of consecutive sub-windows.

If the upper half of the window increases, the top edge lines are shifted by the slope of the target in step 74 which shifts the lateral sides of the conforming window so that they more nearly approximate the orientation of the target image.

A similar process step 75 shifts the bottom edge line proportional to the slope of the central target centroids in the event that the bottom half of the window has been increased due to the adjustment calculated in FIG. 10, and the process ends in step 76.

Figure 13:
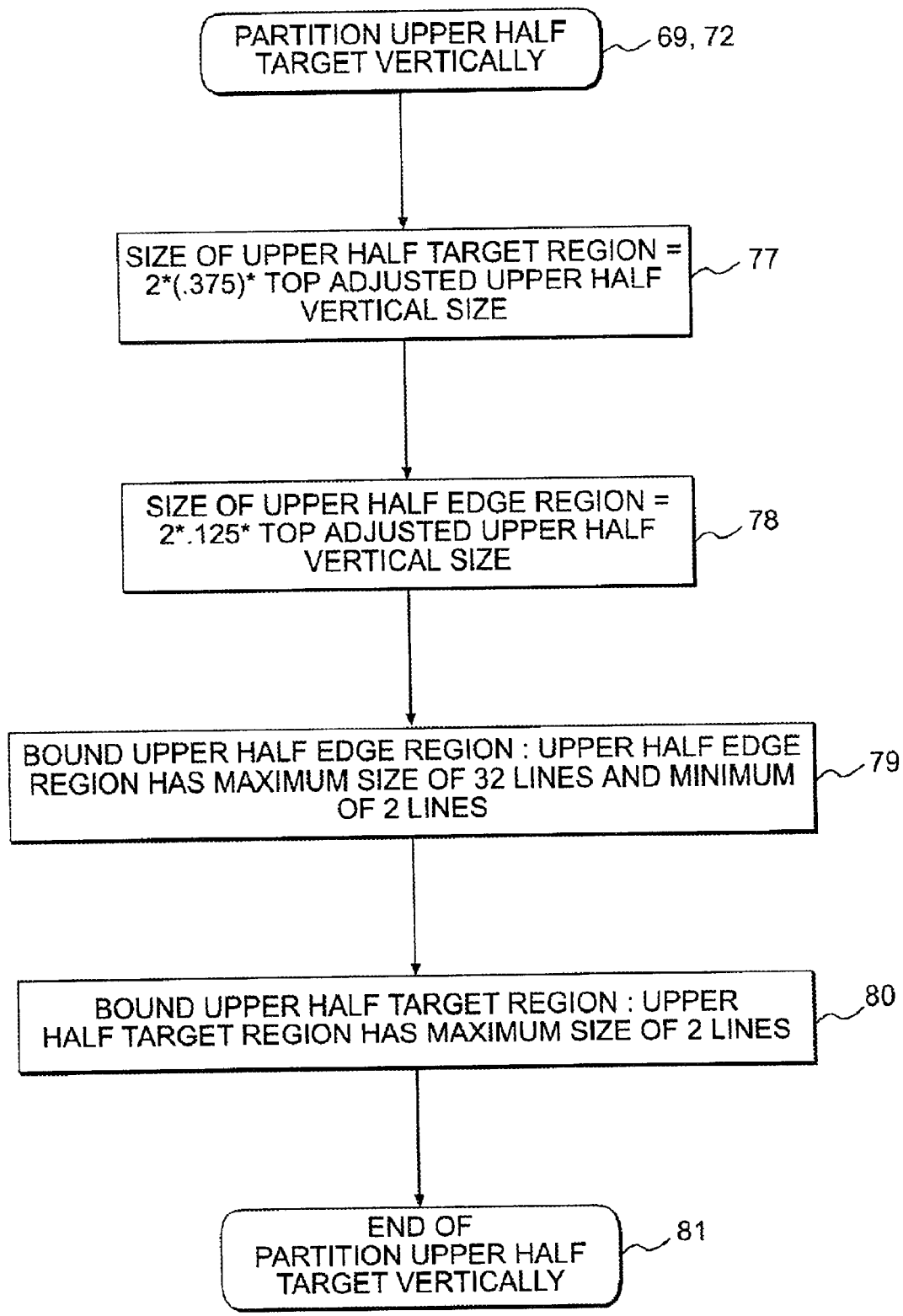
FIG. 13 shows the process for apportioning the upper half and lower half of the target image.

As part of the process for adjusting the vertical window size 44, the upper half of the window was apportioned into edge and target regions in step 69, and the lower half of the window was apportioned as well as edge and target regions in step 72. The process for apportioning the upper half and lower half of the window is shown more particularly in FIG. 13. Once the top and bottom adjustments have been made to the top edge region, and bottom edge region respectively, the regions are newly apportioned in light of the adjustments. Referring to FIG. 13, in the case of apportioning the upper half of the target region, the size of the central target region in step 77 is given by multiplying the newly adjusted size of the target's upper half by a factor of 2, and then by a factor of 0.375. The factor of 2 is needed because the computation is based on only the upper half the target. The factor of 0.375 arbitrarily assigns three-fourths of the total (both upper and lower halves) window size to the target region. In a similar manner, in step 78, the top edge region is defined as one-eighth of the total window size.

Step 79 bounds the upper half edge region so that the top edge region has a maximum of 32 video lines, and a minimum of 2 video lines. The upper half of the central target region is similarly limited so that it has a minimum size of 2 video lines in step 80, and the process then ends in step 81.

The foregoing description of the invention illustrates and describes the present invention. Additionally, the disclosure shows and describes only the preferred embodiments of the invention in the context of a video tracking system, but, as mentioned above, it is to be understood that the invention is capable of use in various other combinations, modifications, and environments and is capable of changes or modifications within the scope of the inventive concept as expressed herein, commensurate with the above teachings and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form or application disclosed herein. Also, it is intended that the appended claims be construed to include alternative embodiments.

What is claimed:

1. An automatic video window generation system comprising:

a source of video signals containing successive frames of images of a target;

processing means for resizing a window which bounds an object image in said video signal by executing the steps of:

determining which lines of video signal contain the object image based on the density of pixels contained in said video signal;

determining a length of each of said lines containing said object image;

determining the principal orientation of said target image from said lines;

shifting the starting and ending points of said lines in accordance with said principal orientation to define the width of said window in a subsequent frame; and determining a vertical size for said window by determining which lines of said video signal contains said target image.

2. The automatic video window generation system of claim of 1 wherein said step of determining said line size comprises determining for each of said lines right and left edge portions and a central portion of said line, and determining the new line size by the respective density of each of said portions.

3. The automatic video window generation system of claim 1 wherein said vertical size is determined from the additional steps of:

determining whether each of said lines containing said target image are in a top or bottom edge region of said target region; and for each of said lines in a top or bottom region, expanding the top and bottom regions to include additional lines if the density of each top or bottom region line is greater than a pixel density determined from the overall pixel density of a previous frame.

4. The automatic video window generation system of claim 3 further comprising reducing the top and bottom regions if the density of lines in said top and bottom region are less than a pixel density determined from a previous frames overall density.

5. The automatic video window generation system of claim 1 wherein said step of determining a principle orientation for said image comprises determining the centroid of each line in a central region of said object image.

6. The automatic video window generation of system of claim 3 wherein said additional lines have starting and ending points based determined from said principle orientation.

7. An automatic video window generation system comprising:

a source of video signals containing successive frames of images of a target;

a processing means connected to receive each said video signals containing frames of images, and resizing a window within said frames of images containing said target, based upon the density of pixels classified as target on each line of video signal within said window, said processing means executing the steps of:

(a) defining a top edge region, bottom edge region and central region for said target image;

(b) determining a length of each line segment in each of said regions; and (c) re-sizing a window for a subsequent frame of said video signal based on said length of each line segment and defined regions.

8. The automatic video window generation system according to claim 7 wherein said processing means defines left and right edge regions and a central region of each line segment containing said target, and establishes a line size of a line of a succeeding frame based on the pixel density of said edge regions and central region of each line segment of a previous frame containing said target.

9. The automatic video window generation system according to claim 8 where the vertical adaptation of the window is based upon the slope of the target.

10. The automatic video window generation system according to claim 8 wherein said line segments added to the top and bottom of the current window are shifted an amount based on the slope of the target determined for each of said line segments in said target region.

11. The automatic video window generation system according to claim 7 wherein said processing means computes an adjustment for the top edge of a succeeding frame of video signals by performing the steps of:

(a) computing a target pixel density of each line in said top edge region;

(b) if the computed line density for a line is greater than a reference density computed from the line of the previous frame, then the top edge adjustment is increased by one line; and (c) if the line density is less than a second reference computed from the line density of the previous frame, then the top edge adjustment is decreased by one line.

12. The automatic video window generation system according to claim 7 wherein said processing means defines for each of said line segments first and second edge portions of said target image separated by a central portion of said target image.

13. The automatic video window generation system of claim 12 wherein said line size length is determined by performing the steps of:

(a) determining the density of the first edge portion of each line;

(b) determining the density of said second edge portion of each line;

(c) determining the density of said central portion of each line;

(d) determining a size error from said first, second and centroid portions of each line;

(e) modifying the line size of the same line in a subsequent frame of said video signal according to said size error.

14. The automatic video window generation system according to claim 13 wherein said size error is weighted according to the length of each line prior to modifying the line size of the same line of said subsequent frame.

15. An automatic video window generation system comprising:

a source of video signals containing successive frames of images of a target for viewing;

display means for displaying said target from said video signals;

processor means for selecting a window separating said target from a remaining portion of said image constituting non-target background information, said processor means being programmed to execute the steps of:

(a) selecting a first top edge portion of said target, a second bottom edge portion of said target within, and a central target region of said target in said window based on the density of each video line contained within a window;

(b) processing each line of video signal in said first top edge portion, bottom edge portion, and central target region to obtain a size of each line of video signal; and (c) selecting the beginning line of each of said top edge, and bottom edge for a subsequent frame of video signal based on the size of each line and the density of each line.

16. The automatic video window generation system according to claim 15 wherein said processor means further adjusts the top and bottom edge portions by the steps of:

determining whether the line size in said top and bottom portions is less than a minimum line size;

determining whether the line density of said lines in said top and bottom portion is less than a threshold density;

increasing the top line of said top and bottom edges by 1 if said line size is less than said minimum and said line density is less than said threshold density;

decreasing the top and bottom edge portions by one line of said top and bottom edges by 1 if the density of said line is 0;

increasing the top edge of said top and bottom edges by 1 if the line density is greater than the previous field's overall target pixel line density multiplied by a factor of alpha; and decreasing the top line by 1 in said top and bottom edges if the line density is less than the previous fields overall target pixel line density multiplied by a factor of B.

17. The automatic video window generation system according to claim 16 wherein the line size for each line in said top edge, bottom edge and target regions is determined by said processor means by executing the steps of:

determining a left and right edge for each of said lines;

determining from said left and right edges the density of each of said edges;

determining an overall edge density of said right and left edge densities;

determining a target density for a central region of each of said lines containing said target; and determining a size error for each line based on said target density, and edge density; and resizing said line based on said present line length and said size error.

18. The automatic video window generation system according to claim 17 wherein said processor means, following said step of resizing said line, executes the step of partitioning each new line into left and right edge regions bounding a target region.

19. A method for controlling a window which bounds a target image contained in a video signal comprising:

supplying a video signal frame comprising a plurality of lines of image information including said target image;

selecting a window which includes segments of said plurality of lines which includes said target image;

selecting from said segments of said plurality of lines a top edge region, bottom edge region and target region of said target image;

determining for a subsequent frame of said video signal said window comprising the steps of:

determining a target density for each of said segments of said plurality of lines in said window;

determining a new line size for each of said line segments based on said line density;

determining from the line size of said line segments contained in said window a new top edge region, bottom edge region and target region; and selecting a new window to include said new top region, bottom region and said target region.

20. The method for controlling a window according to claim 19 further comprising:

determining for each new line segment within said target region the location of a centroid;

determining a slope of a line defined by said centroids; and shifting the top and bottom edge region line segments according to said slope.

21. The method according to claim 19 wherein said new top region is determined by the steps of:

determining as a first condition whether said new line size is less than a minimum and has a line density which less than a threshold density;

decreasing said top region by a predetermined number of lines when said first condition is determined; and expanding said determined line size an adjustment factor;

determining as a second condition if said line density of said new line size is 0;

decreasing said top region by a predetermined number of lines when said second condition is determined;

determining as a third condition whether said line density of each of said line segments in said top region is greater than the previous fields overall target region pixel line density multiplied by a scale factor;

increasing the top region by a predetermined number of lines when said third condition is determined;

determining as a fourth condition whether said line density is less than the previous frame overall target region pixel density multiplied by a second scale factor; and decreasing the top region by a predetermined number of lines when said fourth condition is determined.

* * * * *